US008914509B2

(12) United States Patent
Boleyn et al.

(10) Patent No.: US 8,914,509 B2
(45) Date of Patent: Dec. 16, 2014

(54) EXTENSIBLE CONFIGURATION METHODS FOR OPTICAL NETWORKING APPARATUSES WITH MULTIPLE MULTI-PROTOCOL OPTICAL NETWORKING MODULES

(75) Inventors: Erich S. Boleyn, Portland, OR (US); Juliet Z. Cai, Beaverton, OR (US); Zhi Wang, Beaverton, OR (US); Qiyong B. Bian, Hillsboro, OR (US); Jonathan A. Tuchow, Portland, OR (US); Alfred C. She, Beaverton, OR (US)

(73) Assignee: Null Networks LLC, Las Vegas, NV (US)

( * ) Notice: Subject to any disclaimer, the term of this patent is extended or adjusted under 35 U.S.C. 154(b) by 2154 days.

(21) Appl. No.: 10/211,047

(22) Filed: Aug. 2, 2002

(65) Prior Publication Data

US 2004/0057390 A1 Mar. 25, 2004

(51) Int. Cl.
*G06F 15/173* (2006.01)
*G06F 15/177* (2006.01)
*H04L 12/24* (2006.01)

(52) U.S. Cl.
CPC ............. *H04L 41/08* (2013.01); *H04L 41/0803* (2013.01)
USPC ............ 709/226; 709/220; 709/221; 709/222

(58) Field of Classification Search
USPC .................................................. 709/220–229
See application file for complete search history.

(56) References Cited

U.S. PATENT DOCUMENTS

| | | | | |
|---|---|---|---|---|
| 6,083,276 | A * | 7/2000 | Davidson et al. | 717/107 |
| 6,542,912 | B2 * | 4/2003 | Meltzer et al. | 705/39 |
| 6,567,413 | B1 * | 5/2003 | Denton et al. | 370/401 |
| 6,973,512 | B1 * | 12/2005 | Koeman | 710/38 |
| 6,978,301 | B2 * | 12/2005 | Tindal | 709/223 |
| 7,065,562 | B2 * | 6/2006 | Courtney | 709/220 |
| 7,305,667 | B1 * | 12/2007 | Saulys et al. | 717/143 |
| 7,320,132 | B2 * | 1/2008 | Garcelon | 719/328 |
| 2002/0032806 | A1 * | 3/2002 | Machin et al. | 709/328 |
| 2002/0059404 | A1 * | 5/2002 | Schaaf et al. | 709/220 |
| 2002/0152289 | A1 * | 10/2002 | Dube | 709/220 |
| 2002/0191619 | A1 * | 12/2002 | Shafer | 370/401 |
| 2003/0023707 | A1 * | 1/2003 | Ryan | 709/220 |

* cited by examiner

*Primary Examiner* — Shirley Zhang
(74) *Attorney, Agent, or Firm* — Schwabe Williamson & Wyatt

(57) ABSTRACT

An API including a registration function and a configuration function, is provided to an optical networking apparatus to facilitate registration of configuration specification delimiter pairs by service routines of function blocks of multi-protocol optical networking modules (MPONM), and extraction of configuration specifications for the function blocks from a configuration specification input set using the registered configuration specification delimiter pairs. In one embodiment, the configuration function also receives current configuration of the function blocks, and merges the received current configurations of the function blocks into a configuration specification output set, separating the merged configuration specification using the registered configuration specification delimiters.

33 Claims, 13 Drawing Sheets

600

```
<?xml version="1.0"  encoding="UTF-8"  ?>
<! - - Example configuration file  - - >

<MPMcfg>

        <ChipName> Lithium </ChipName>
        <APIversion> 1.0a </APIversion>
602a~<MODULE>
                <Flow> MAC WAN </Flow> ~604a
                <WrtLatency> 3 </WrtLatency> ~604b
                <! - - Other global module settings . . .  - - >
602a~</MODULE>

602b~<SPI>
                <Loopback>          True  </Loopback>
                <EnableEgress>      True  </EnableEgress> ~604c
                <EnableIngress>     True  </EnableIngress> ~604d
                <BRSTSize>          8  </BRSTSize> ~604e
602b~</SPI>

602c~<SONET>
                <Mode>Packet</Mode>

                <CapUnit>
                                <Name>      J0  </Name>
                                <Handle>    0x00001001  </Handle>
                        <Row>       0  </Row> ~604f
                        <Column>    2  </Column> ~604g
                        <Plane>     0  </Plane> ~604h
                        <Ref>       frame  </Ref>
                        <Behavior>  FIFO  </Behavior> ~604i
                        <Channel>   0x00001002  </Channel> ~604j
                </CapUnit>

                <! - - Other SONET settings . . . - - >
602c~</SONET>

                <! - - Other blocks . . . - - >

</MPMcrg>
```

| Function Block ID | FB_Config_Set ID | FB_Config_Get ID |
| --- | --- | --- |
| SPI | SPI_Config_Set | SPI_Config_Get |
| Sonet | Sonet_Config_Set | Sonet_Config_Get |
| | | |
| | | |

702

EXTENSIBLE CONFIGURATION METHODS FOR OPTICAL NETWORKING APPARATUSES WITH MULTIPLE MULTI-PROTOCOL OPTICAL NETWORKING MODULES

FIELD OF THE INVENTION

The present invention relates to software methods and networking apparatuses. More specifically, the present invention relates to extensible software methods for configuring multi-protocol optical networking modules (MPONM) in an optical networking apparatus.

BACKGROUND OF THE INVENTION

With advances in integrated circuit, microprocessor, networking and communication technologies, an increasing number of devices, in particular, digital computing devices, are being networked together. Devices are often first coupled to a local area network, such as an Ethernet based office/home network. In turn, the local area networks are interconnected together through wide area networks, such as SONET networks, ATM networks, Frame Relays, and the like. Of particular importance is the TCP/IP based global inter-network, the Internet. Historically, data communication protocols specified the requirements of local/regional area networks, whereas telecommunication protocols specified the requirements of the regional/wide area networks. The rapid growth of the Internet has fueled a convergence of data communication (datacom) and telecommunication (telecom) protocols and requirements. It is increasingly important that data traffic be carried efficiently across local, regional, as well as wide area networks.

As a result of this trend of increased connectivity, an increasing number of applications that are network dependent are being deployed. Examples of these network dependent applications include but are not limited to, the world wide web, email, Internet based telephony, and various types of e-commerce and enterprise applications. The success of many content/service providers as well as commerce sites depend on high speed delivery of a large volume of data across wide areas. As a result, high speed data trafficking devices, such as high speed optical, or optical-electro routers, switches and so forth, are needed.

Unfortunately, because of the multiplicity of protocols, including datacom and telecom protocols, that may be employed to traffic data in the various types of networks, designers and developers of networking components and equipment, such as line cards, routers and switchers, have to wrestle with a multitude of prior art protocol processors. Each of these protocol processors is typically dedicated to the support of either local/regional or regional/wide area protocols, in their design of these components/equipment. This burden is costly, and slows down the advancement of high speed networks.

U.S. patent application Ser. Nos. 09/860,207 and 09/861,002, both filed on May 18, 2001, entitled "A MULTI-PROTOCOL NETWORKING PROCESSOR WITH DATA TRAFFIC SUPPORT SPANNING LOCAL, REGIONAL AND WIDE AREA", and "AN OPTICAL NETWORKING MODULE INCLUDING PROTOCOL PROCESSING AND UNIFIED SOFTWARE CONTROL" respectively, disclosed a novel highly flexible multi-protocol processor capable of supporting high-speed data traffic in local, regional, and wide area networks, and a multi-protocol optical networking module that can be constructed from such a multi-protocol processor. Resultantly, sophisticated optical-electrical networking apparatuses such as optical-electrical routers and switches may be built more efficiently with multiple ones of the disclosed multi-protocol optical networking module (each having its own multi-protocol processor).

In turn, the task for developing networking applications for such sophisticated optical-electrical networking apparatus with multiple ones of the disclosed multi-protocol optical networking module (each having its own multi-protocol processor) have become much more difficult, in particular, the task for equipping the networking applications with the ability to configure and dynamically re-configure such networking apparatuses. Accordingly, a software architecture, including methods, that reduces the complexity and improves the ease for developing networking applications for such complex networking apparatuses with multiple ones of the disclosed multi-protocol optical networking module (each having its own integrated multi-protocol processor) is desired.

BRIEF DESCRIPTION OF THE DRAWINGS

The present invention will be described by way of exemplary embodiments, but not limitations, illustrated in the accompanying drawings in which like references denote similar elements, and in which:

FIG. 6 illustrates an example configuration specification input/output set of the present invention, in accordance with one embodiment;

DETAILED DESCRIPTION OF EMBODIMENTS OF THE INVENTION

Figure 1:
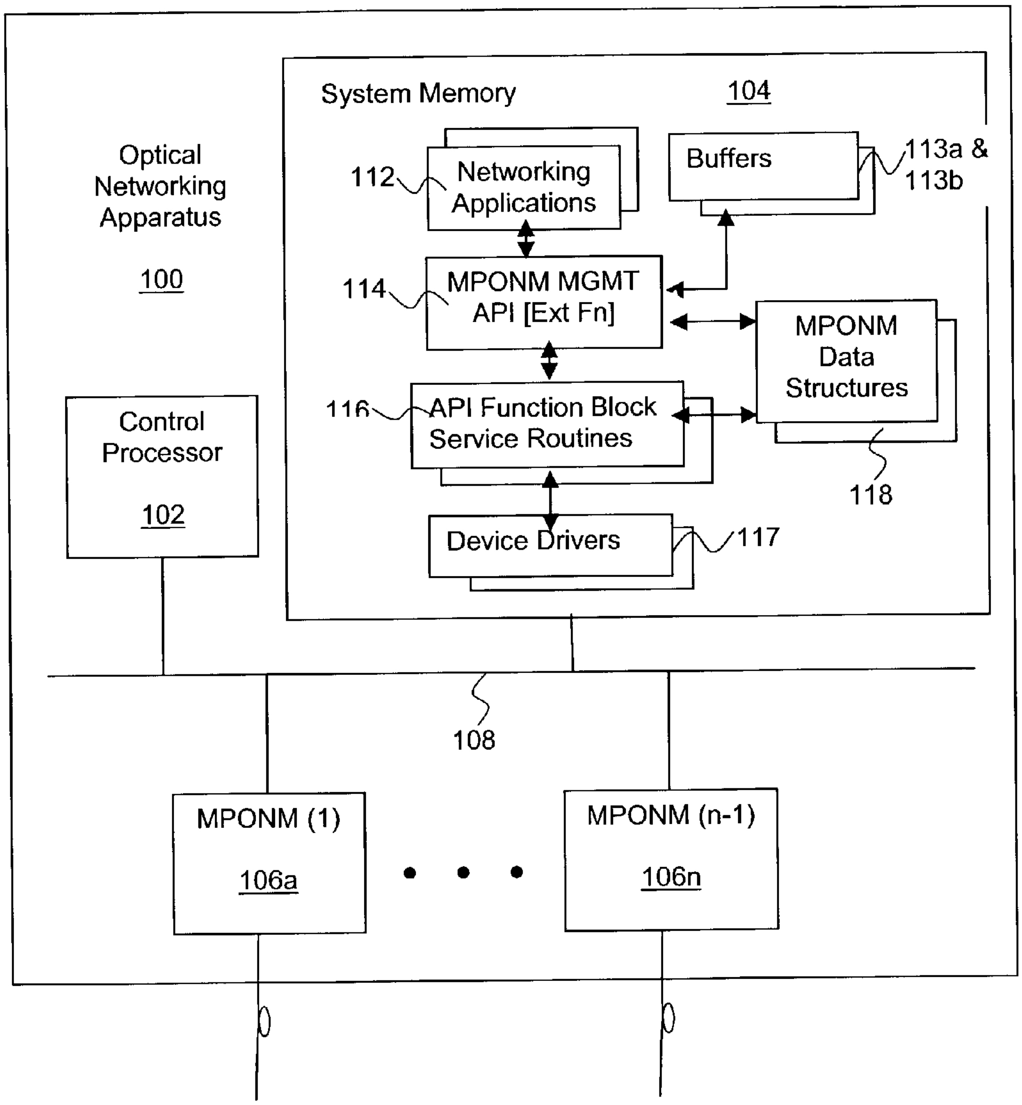
FIG. 1 illustrates an overview of the software method of present invention, including an optical-electrical networking apparatus having multiple MPONM (each integrated with a multi-protocol processor), within which the present invention may be practiced, in accordance with one embodiment.

The present invention includes software methods, in particular, an application programming interface (API) for networking applications to interact with function blocks of multi-protocol processors of the MPONM of an optical-electrical networking apparatus, including API and function block service routines supporting configuration of the function blocks of the multi-protocol processors of the MPONM in an extensible manner.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

TERMINOLOGY

Parts of the description will be presented in data processing terms, such as data, variables, methods, request, return, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Part of the descriptions will be described using networking terms, including but are not limited to:

| | |
|---|---|
| Egress | Outgoing data path from the system to the network |
| HDLC | High-Level Data Link Control. A communication protocol used in a Packet Over SONET switching network. |
| Ingress | Incoming data path from the network to the system |
| IP | Internet Protocol |
| LAN | Local Area Network |
| MAC | Media Access Control layer, defined for Ethernet systems |
| POS | Packet Over SONET |
| PPP | Point to Point Protocol |
| SONET | Synchronous Optical NETwork, a PHY telecommunication protocol |
| WAN | Wide Area Network |

The terms "provide" and "providing", and other terms of the like, as used in this specification and in the claims, include indirect as well as direct provision of the object of the provision operation. That is, an entity A may "provide" another entity B with an item C (the object of the provision operation) directly, or indirectly by providing entity B with information to obtain the object item C, such as a pointer to a location from which the object item C may be obtained.

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Overview

Figure 5A:
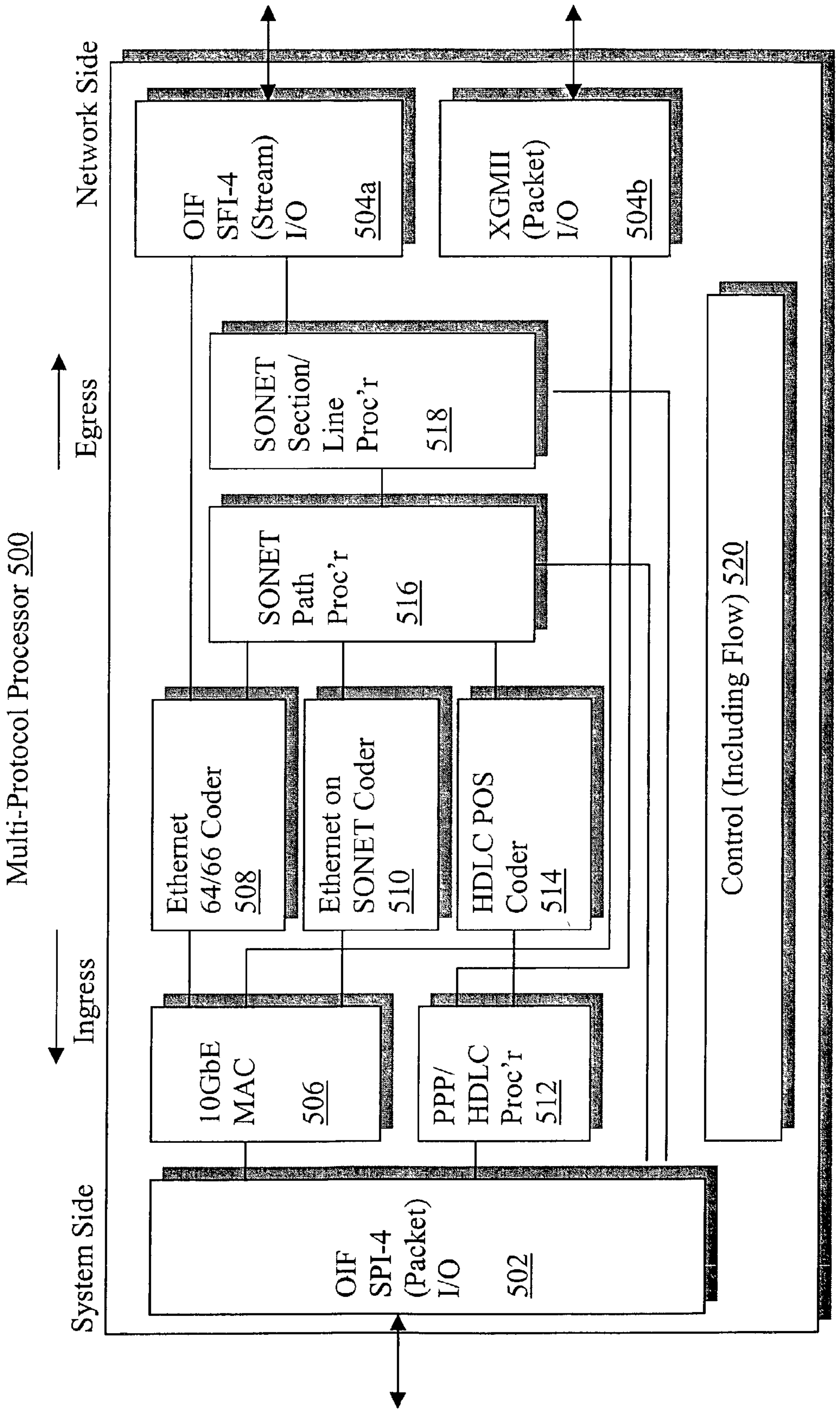
FIGS. 5*a*-5*b* illustrate a multi-protocol processor of a MPONM and the MPONM API of FIG. 1 in further details respectively, in accordance with one embodiment each.
Figure 5B:
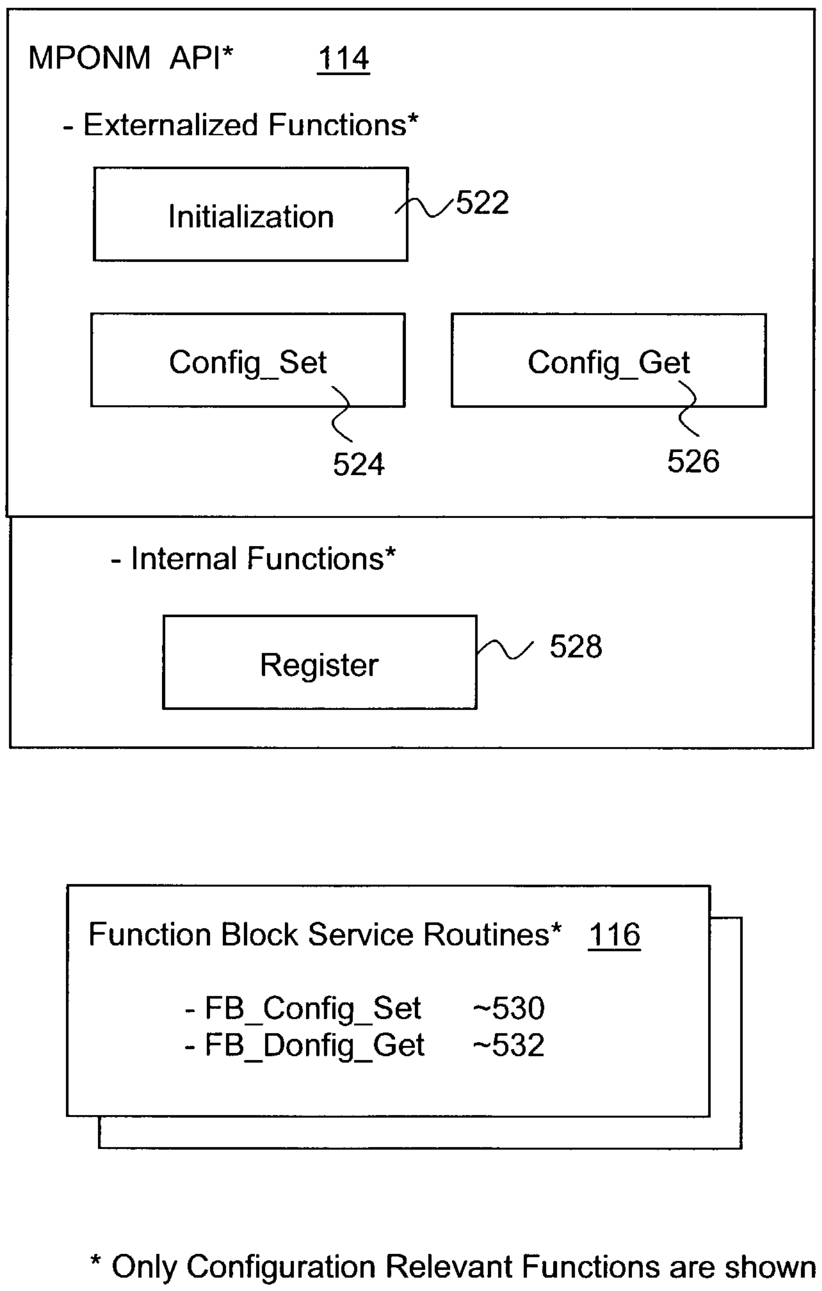

Referring now to FIGS. 1 and 5*a*-5*b*, wherein three block diagrams illustrating an overview of the software method of the present invention, in accordance with one embodiment, including an optical-electrical networking apparatus 100 having multiple MPONM 106*a*-106*n* within which the present invention may be practiced, are shown. As illustrated, for the embodiment, optical networking apparatus 100 includes a number of MPONM 106*a*-106*n*, a control processor 102, and memory 104, coupled to each other through system bus 108. Each of MPONM 106*a*-106*n* includes at least one multi-protocol processor having a number of function blocks, as illustrated in FIG. 5*a*, and as described in the above identified co-pending U.S. pending patent applications.

In various embodiments, the various MPONM 106*a*-106*n* may be connected to system bus 108 in like or different manners. For examples, all MPONM 106*a*-106*n* may be connected via corresponding serial or parallel interfaces, or some MPONM 106* are connected via corresponding serial interfaces, while others are connected via corresponding parallel or other bus interfaces.

Accordingly, for the embodiment, various device drivers 117 are provided to facilitate the various corresponding types of interfaces for connecting MPONM 106*a*-106*n* to system bus 108. That is, a serial interface oriented device driver 117 is provided to facilitate connection of some or all of MPONM 106*a*-106*n* via corresponding serial interfaces, a parallel interface oriented device driver 117 is provided to facilitate connection of some or all of MPONM 106*a*-106*n* via corresponding parallel interfaces, and so forth.

In one embodiment, the function blocks of a multi-protocol processor include a system interface block 502, network interface blocks 504*a*-504*b*, a MAC block 506, an Ethernet 64/66 coder 508, an Ethernet on SONET coder block 510, a PPP protocol and HDLC processor block 512, a HDLC Packet over SONET coder block 514, a SONET path processor block 516, a SONET section and line processor block 518, and a control interface 520. The various function blocks 502-520 are selectively employed in combination to service data transmission and receipt in accordance with a selected one of a number of frame based protocols, including frame based protocols encapsulated within a synchronous protocol, as well as streaming and packet variants of the synchronous protocol. These protocols include at least one each a datacom and a telecom protocol.

Briefly, the system interface block 502 is employed to facilitate input of egress data from the system and output of ingress data to the system from the MPONM. The MAC block 506 is employed to perform data link sub-layer media access control processing on egress and ingress MAC data. The Ethernet 64/66 coder and Ethernet on SONET Coder blocks 508-510 are provided to perform physical sub-layer 64/66 and Ethernet on SONET coding and decoding for the egress and ingress MAC data respectively.

The PPP/HDLC processor block 512 is employed to perform data link sub-layer point-to-point protocol and high level data link control processing on IP, PPP, and HDLC data. The PPP/HDLC processor 512 is employed to frame or de-frame IP and POS data, providing appropriate encapsulation or de-encapsulation, in accordance with PPP and HDLC. The HDLC POS coder block 514 is provided to perform physical sub-layer Packet Over SONET coding and decoding for the egress and ingress HDLC data respectively.

The SONET path processor block 516 is provided to perform path processing for "packetized" SONET data and coded frame-based data, whereas the SONET section and line processor block 518 is provided to perform section and line processing for "packetized" as well as "streaming" SONET data. The network interface blocks 504*a*-504*b* are provided to facilitate output of egress data and input of ingress data.

Control interface 520 is employed to facilitate interaction between the multi-protocol processor and external devices.

The optical-electrical components of a MPONM 106* include e.g. digital-to-analog and analog-to-digital components, as well as laser components for encoding data on an optical beam and/or decoding data from an encoded optical beam. For the purpose of the present application, the optical-electrical components of a MPONM 106* is also referred to as a "function block". Accordingly, the term "function block" as used in the claim refers to a selected one of the function blocks of a multi-protocol processor and the collection of the optical-electrical components of a MPONM 106*. Thus, if networking applications 112 are required to access, control or otherwise interact with each of these function blocks of each of the multi-protocol processors of the MPONM directly, the complexity may become if not prohibitive, at least not very productive for the average software developers, especially in view of the multiplicity of multi-protocol processors and MPONM present in each optical networking apparatus 100.

Accordingly, under the present invention, MPONM API 114 and function block service routines 116 are provided for interfacing with the function blocks of the multi-protocol processors of the MPONM 106*, to insulate the complexity of the function blocks of the multi-protocol processors of the MPONM 106* from networking applications 112.

In particular, for the embodiment illustrated in FIG. 5*b*, MPONM API 114 includes at least externalized module initialization function 522, Config_Set function 524, and Config_Get function 526, as well as internal configuration related Register function 528. The elements 522-528 are provided to further streamline the interactions between networking applications 112 and MPONM function block service routines 116, especially with respect to configuring the various function blocks of the multi-protocol processors of MPONM 106*.

The terms "externalized" and "internal" are used in the current context from the visibility perspective of networking applications 112 for ease of understanding. Such characterizations have no significance as to the essence of the present invention.

Also for ease of understanding, only the configuration relevant functions of API 114 are shown and described. In various embodiments, API 114 may further include other functions to facilitate other interactions between networking applications 112 and MPONM 106*.

For the embodiment, each "participating" function block service routine 116 includes corresponding implementations of FB_Config_Set and FB_Config_Get functions 530-532.

MPONM API 114 buffers networking applications 112 making access, controlling, or otherwise interacting with MPONM, through MPONM function block service routines 116 using MPONM module data structures 118, one for each MPONM 106*.

More specifically, initialization function 522 is employed to initialize corresponding module data structures 118 for MPONM 106* to facilitate the interactions.

Config_Set and Config_Get functions 524-526 are employed to facilitate networking applications 112 in configuring the function blocks of the multi-protocol processors of MPONM 106* and obtaining the current configuration respectively. Config_Set function 524 obtains the configuration specifications from buffer 113*a* set up by networking applications 112. In one embodiment, Config_Set function 524 is provided with a pointer to buffer 113*a*, when invoked. Similarly, Config_Get function 526 outputs the requested current configuration specifications into buffers 113*b*, which too is set up by network applications 112. In one embodiment, Config_Get function 524 is provided with a pointer to buffer 113*b*, when invoked.

For the embodiment, both Config_Set function 524 and Config_Get function 526 effectuate their functions using the configuration specification delimiters registered by the function block service routines 116, and in cooperation with the FB_Config_Set and FB_Config_Get functions 528-530 of the applicable function block service routines 116.

Configuration related Register function 528 is employed to facilitate the corresponding function block service routines 116 in registering corresponding configuration specification delimiters for the function blocks (which as describer earlier and to be explained in more detail later, are used by Config_Set and Config_Get functions 524-526).

FB_Config_Set and FB_Config_Get functions 530-532 of the function block service routines 116 are employed to actually configuring the corresponding function blocks of the multi-protocol processors of the MPONM 106* and retrieve (and/or output) the current configuration of the function blocks respectively.

In one embodiment, portions of module data structures 118 are also used by the above described configuration related functions to store a portion or all configuration related data. In other embodiments, other configuration related working data structures are created during the configuration or configuration read out process, and deleted upon completion of the configuration or configuration read out.

Except for MPONM API 114, including the initialization, Config_Set, Config_Get and Register functions 522-528, the teachings of the present invention incorporated with function block service routines 116, including service routines 116 implementing FB_Config_Set and FB_Config_Get functions 530-532, and the manner networking applications 112 and function block service routines 116 cooperate with MPONM API 114, networking applications 112 and function block service routines 116 otherwise represent a broad range of such elements known in the art, and are typically application dependent. Accordingly, except for the manner networking applications 112 and function block service routines 116 cooperate with MPONM API 114, the two types of elements will not be otherwise further described.

[The asterisk at the end of a reference number denotes a "wild card", representing any of the trailing suffixes of the reference numbers employed in a figure. For example, 106* stands for 106*a*, 106*b* or any one of the other 106 references of FIG. 1.]

Networking Applications

Figure 2A:
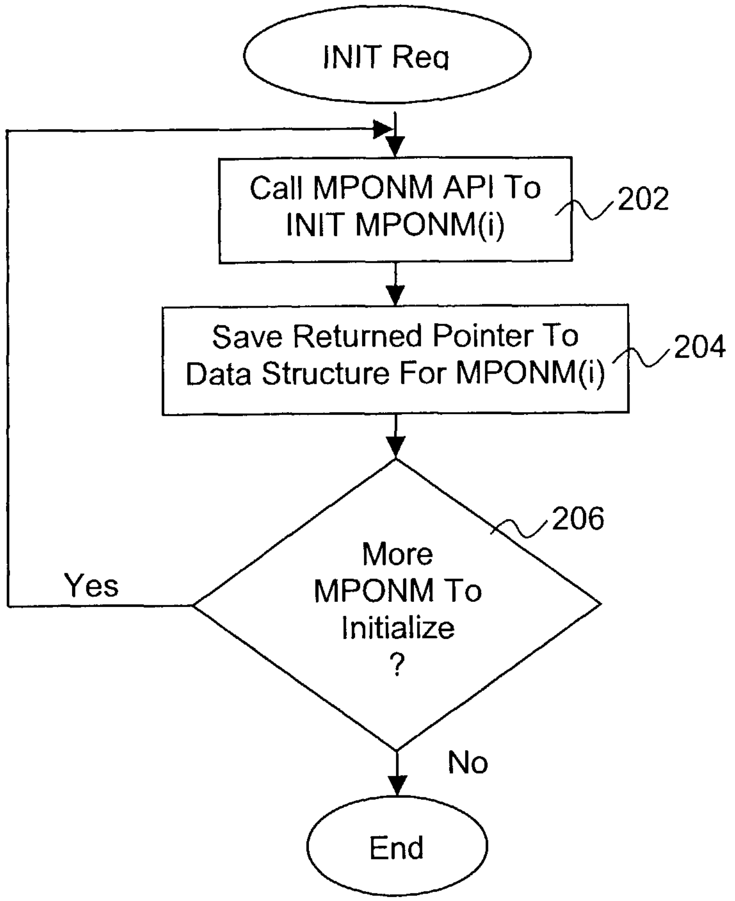
FIGS. 2*a*-2*b* illustrate the operational flow of the relevant aspects of a networking application of FIG. 1 interacting with the MPONM API of the present invention, to access, control and/or otherwise interact with the function blocks of the multi-protocol processor of the MPONM, in accordance with one embodiment.
Figure 2B:
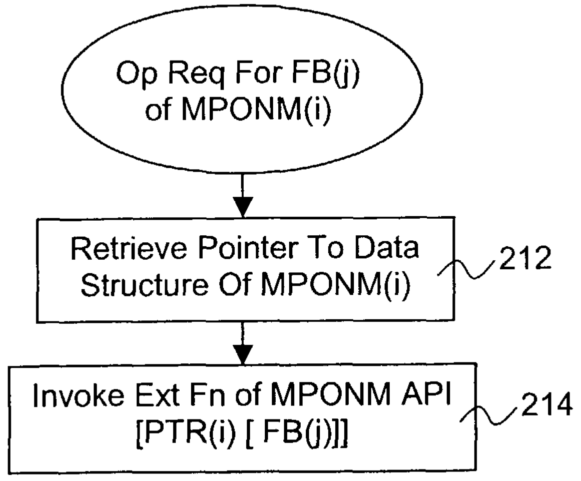

FIGS. 2*a*-2*b* illustrate the operating flow of the relevant aspects of networking applications 112 for practicing the present invention, in accordance with one embodiment. As illustrated in FIG. 2*a*, under the present invention, i.e. with the provision of MPONM API 114 including module initialization function 522, at initialization or a subsequent point in time during operation, at the desire of a networking application 112, the networking application 112 invokes initialization function 522 of MPOMN API 114 to initialize a desired MPONM 106* it wants to subsequently access, control or otherwise interact with, block 202.

In one embodiment, networking application 112 identifies the particular MPONM 106* by providing the "handle" of the device driver 117 handling the connecting interface through which the particular MPONM 106* is connected to bus 108, and if applicable, information (such as memory mapped addresses, port numbers and so forth) associated with how the particular MPONM 106* is mapped on the connecting interface.

As will be described in more detail below, in response, module initialization function 522 of MPONM API 114, in conjunction with the function block service routines 116, advantageously creates an instance of a MPONM structure 118 for the desired MPONM 106* to be initialized (if the data structure 118 has not been previously created for the MPONM 106*), to facilitate subsequent access, control and/or interaction with the desired MPOMN 106* by networking applications 112, including configuration of the function blocks the multi-protocol processors of the desired MPONM 106*. As part of the process, a handle of the module data structure 118 for the initialized MPONM 106* is returned. More specifically, in one embodiment, the "handle" is a pointer to the corresponding module data structure 118 of the initialized MPONM 106*.

Thus, as illustrated, networking application 112 saves the returned handle (or pointer) to the module data structure 118 for the initialized MPONM 106*, upon receipt of the handle (or pointer) from module initialization function 522 of MPONM API 114.

Thereafter, networking application 112 determines if another MPONM 106* is to be initialized, block 206. If so, operations 202-204 are repeated; else the initialization process for networking application 112 continues and proceeds to completion.

In other embodiments, module initialization function 522 may support each initialization request requesting initialization of one or more desired MPONM 106* instead. For these embodiments, more than one desired MPONM 106* may be specified in a single request, with the request returning multiple corresponding handles (or pointers) for the successfully initialized ones of the requested MPONM 106*.

As illustrated in FIG. 2*b*, upon having a need to request a service or having an operation performed in a function block of a MPONM 106* (such as configuring a MPONM or obtaining current configuration of a MPONM), networking application 112 retrieves the handle (or pointer) to the data structure 118 of the MPONM 106*, block 212, formats, and submits the request to an appropriate externalized function of MPONM API 114 (e.g. Config_Set function 524 or Config_Get function 526).

For the embodiment, each request may also include an identification of the function block within which the requested operation is to be performed. However, the identification of the function block is not explicitly particularized to a MPONM 106*; and neither is an identification of the MPONM 106* provided. Instead, the MPONM 106* within which the function block of the requested operation is to be performed is implicitly identified. More specifically, for efficiency of operation, the handle (or pointer) of the module data structure 118 of the MPONM 106* is provided.

As those skilled in the art would appreciate, the implicit reference through the handle or pointer of the module data structure 118 of the MPONM 106* of interest improves the ease of the use for the software developers of networking applications, who are more used to working with handles/pointers, as opposed to having to be cognizant of specific hardware modules, and hardware details, including the details of the connection interfaces through which the MPONM 106* are correspondingly connected.

Module Data Structure

Figure 3:
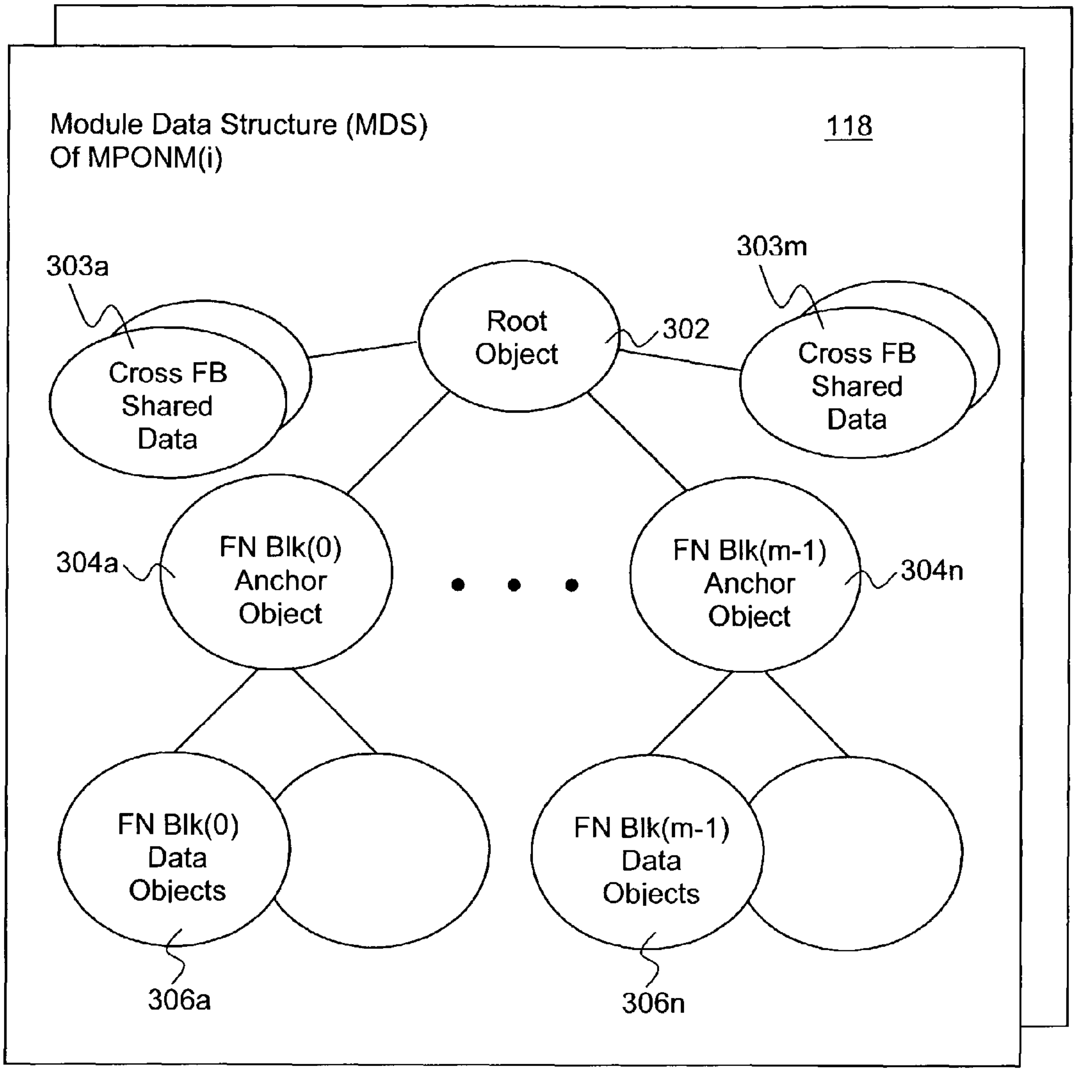
FIG. 3 illustrates the corresponding module data structures of a MPONM, employed to practice the present invention, in further detail, in accordance with one embodiment.

FIG. 3 illustrates an exemplary data organization suitable for use to practice the present invention, in accordance with one embodiment. As illustrated, for the embodiment, module data structures 118 employed to store various global as well as function block specific data of a MPONM (such as registered configuration specification delimiters) to facilitate the practice of the present invention are implemented in an object oriented manner.

As described earlier, one module data structure 118 is employed for each MPONM 106*. In some embodiments, module data structures 118 are also employed to store the configuration related data. In other embodiments, additional configuration related working data structures created on demand, and deleted upon usage are also employed to facilitate configuration of the MPONM 106*.

As illustrated, each module data structure 118 includes a root object 302 and cross function block objects 303* having cross function block shared data variables. Examples of data included in root object 302 include but are not limited to data and/or pointers employed in interacting with the appropriate device driver 117 for the particular MPONM 106*. Examples of such cross function data block shared variables include module identifier, and registers for putting data into and getting data out of selected ones of the function blocks of the MPONM 106*.

Additionally, each data structure 118 includes a number of "anchor" data objects 304*, one each for the function blocks supported. "Anchor" data objects 304* may include a number of function block specific control data variables. Examples of such function block specific control data variables include status variables denoting e.g. whether the corresponding function block service routine 116 was successful in performing certain requested operations, registered configuration specification delimiters, and so forth.

Further, attached with each "anchor" data objects 304* of the function blocks, are function block specific data objects 306*, having function block specific operational data variables. Examples of such function block specific operational data variables include bit masks, data rates, filter criteria, current configuration for various configurable parameters, and so forth.

In alternate embodiments, the present invention may be practiced using other data organization approaches.

Module Initialization Function

Figure 4:
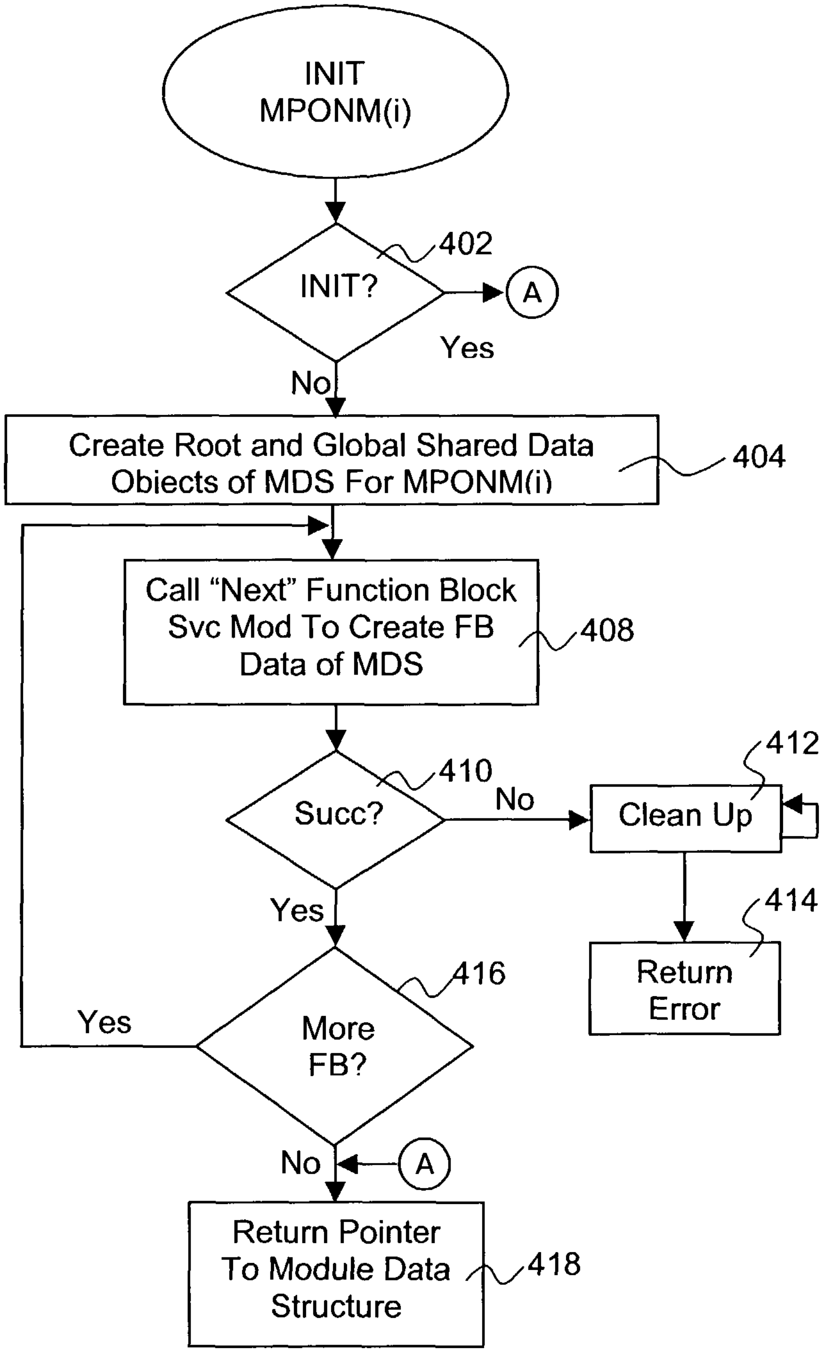
FIG. 4 illustrates the operational flow of the relevant aspects of a module initialization function of the MPONM API of the present invention, in accordance with one embodiment.

FIG. 4 illustrates the operating flow of the relevant aspects of module initialization function 522 of MPONM API 114 for practicing the present invention, in accordance with one embodiment. As illustrated, for the embodiment, upon receipt of a request to initialize a MPONM 106*, initialization function 522 of MPONM API 114 determines if the MPONM 106* has previously been initialized before, block 402. More specifically, initialization function 522 determines whether the module data structure 118 of the MPONM 106* has previously been created or not (e.g. as a result of responding to another initialization request for the same MPONM 106* by the same or another networking application 112). If so, module initialization function 522 returns the handler/pointer of the module data structure 118 of the MPONM 106* immediately, block 418.

Otherwise, i.e. if the module data structure 118 has not been previously created before, module initialization function 522 creates the root object 302 and global shared data objects 303* of the module data structure 118 of the MPONM 106*, block 404.

Thereafter, module initialization function 522 successively calls the corresponding function block service routine 116 of the function blocks to contribute to the creation of module data structure 118 (including anchor and function block specific data objects 304* and 306*) to facilitate subsequent access, control or interaction with MPONM 106* by networking applications 112, block 408.

For the embodiment, after each invocation, module initialization function 522 further determines whether the contributory creation expected of the invoked function block service routine is successful, block 410. If an error is returned for the contributory creation, module initialization function 522 successively undo all prior successful additions to the module data structure 118, block 412, and returns an error notice to the network application 112, block 414.

If the contributory creation was determined to be successful at block 410, module initialization function 522 further determines if additional function block service routines 116 are to be invoked, block 416. If at least one additional function block service routine 116 is to be invoked, module initialization function 522 continues operation at block 408 as earlier described.

If not, the cooperation creation initialization process is completed, and module initialization function 522 returns the handle/pointer of the module data structure 118 of MPONM 106* as earlier described, block 418.

Resultantly, accessing, controlling or otherwise interacting with MPONM 106* by networking applications 112 is streamlined.

For the embodiment, if a function block service routine 116 is invoked to contribute to the creation of a module data structure 118 for the first time (since the last power up/reset), has configurable parameters, and employs special configuration specification delimiters, the function block service routine 116 invokes configuration related Register function 528 to register the special configuration specification delimiters with the MPONM API 114.

In alternate embodiments, registration of the special configuration specification delimiters employed for configurable parameters of different function blocks may be practiced outside the initialization process, and in other, e.g. on demand, manner.

Beyond registration of configuration specification delimiters (if practiced), the exact manner a function block service routine 116 contributes in the creation of the module data structure of a MPONM 106*, i.e. the kind of data variables the function block service routine 116 adds to, maintains, or otherwise manipulates, using module data structure 118 is application dependent. Similarly, the nature and the manner of how the function block service routine 116 interacts with the MPONM 106*, in particular the function block, are application dependent. These issues vary from function blocks to function blocks.

Further, in various embodiments, invocation of the function block service routines 116 to contribute to the creation of the module data structure 118 may be made in a predetermined order, to address certain application dependencies, such as data dependencies between data of different function blocks.

Configuration Specification

FIG. 6 illustrates an example configuration specification, in accordance with one embodiment. The example configuration specification may be an input specification placed into buffer 113*a* for Config_Set function 524 by a networking application 112, or it may be a current configuration output placed into buffer 113*b* for a networking application 112 by Config_Get function 526.

As illustrated, the embodiment employs XML (Extended Mark Up Language) Tags 602* as configuration specification delimiters to delimit global module as well function block specific configuration specifications. Further, XML Tags 604* are also employed to delimit each configuration parameter within each "group", i.e. module/function block, of configuration specifications.

For the particular example configuration specification 600 illustrated, the configuration specifications include a set of configuration specifications specifying configuration for a number of global module parameters, and a number of sets of configuration specifications specifying configuration for a number of function block parameters of a number of function blocks of a multi-protocol processor of a MPONM. Again, for the embodiment, specification 600 does not particularize the MPONM to which the configuration specifications apply (or are associated with). As described earlier, that is effectuated through the inclusion of the handle (or pointer) to the module data structure 118 of the MPONM, when the Config_Set function 524 or Config_Get function 526 is invoked.

The configuration specifications for the global module parameters are delimited by the <module> and </module> tags 602*a*. The example configuration specifications include a configuration specification for "flow type" of the network traffic to be processed by the module, a configuration specification for the write latency of the module, and so forth. These example module related configuration specifications are delimited by the <Flow> and </Flow> tags 604*a* and the <WrtLatency> and </WrtLatency> tags 604*b* respectively.

The configuration specifications for the SPI function block parameters are delimited by the <SPI> and </SPI> tags 602*b*. The example configuration specifications include a configuration specification enabling egress of network traffic, a configuration specification enabling ingress of network traffic, a configuration specification for the data burst size of the function block, and so forth. These example SPI function block related configuration specifications are delimited by the <EnableEgress> and </EnableEgress> tags 604*c*, <EnableIngress> and </EnableIngress> tags 604*d* and the <BRSTSize> and </BRSTSize> tags 604*e* respectively.

The configuration specifications for the SONET function block parameters are delimited by the <SONET> and </SONET> tags 602*c*. The example configuration specifications include a configuration specification for a row, a configuration specification for a column, a configuration specification for a plane, a configuration specification for a channel, a configuration specification for a behavior, and so forth, for a "cap unit". These example SONET function block related configuration specifications are delimited by the <Row> and </Row> tags 604*f*, <Column> and </Column> tags 604*g*, <Plane> and </Plane> tags 604*h*, <Behavior> and </Behavior> tags 604*i*, and <Channel> and </Channel> tags 604*j* respectively.

As those skilled in the art would appreciate, XML tags are complementary, in that, each tag of a tag pair may be inferred from the other, i.e. the end of specification delimiter for global module parameters, </module>, may be inferred from the start of specification delimiter for global module parameters, <module>, or vice versa. Accordingly, for delimiters having such complementary characteristics, only one delimiter of a delimiter pair needs to be known or registered. As most often, regardless of whether configuration specification inputs are being processed or current configurations need to be outputted, the first delimiter to be encountered or outputted would be the "start of configuration specification" delimiter, thus when only one delimiter of a delimiter pair is registered or maintained, potentially, it may be more efficient to register or maintain the "start of configuration specification" delimiter. However, the present invention may be practiced with the "end of configuration specification" delimiter being registered or maintained, or having both being registered or maintained.

Further, the illustrated tags of FIG. 6 are exemplary. Additional tags of like kind may be employed to delimit the configuration specifications for other function blocks, as well as other global parameters of a module or its function blocks. Other non-XML tag delimiters may also be employed instead, to delimit the configuration specifications.

More importantly, by employing delimiters to delimit configuration specifications of global parameters of a module or its function blocks, and by providing Register function 528 to facilitate registration of the delimiters, the configuration approach of the present invention is advantageously extensible, allowing additional parameters and/or function blocks to be configurable in follow on versions of MPONM. The delimiters delimiting the individual configurable parameters need not be registered, as they need to be understandable by the processing FB_Config_Set and FB_Config_Get functions 530-532 only.

As those skilled in the art would appreciate, and as illustrated by exemplary configuration specification 600, for the embodiment, the configuration specifications are inherently hierarchical in their "layout". Resultantly, in one embodiment, to facilitate ease of development, a number of library functions for processing or traversing a hierarchical specification structure, sharable between Config_Set and Config_Get functions 524-526 and the function block implementations of FB_Config_Set and FB_Config_Get functions 530-532, are provided.

These library functions include functions for obtaining a first tag, a last tag, a next tag, a parent tag, a child tag, the name of a tag, the delimited value within a tag, and functions for creating a tag, inserting a parameter value between a tag pair, inserting a tag pair together with its delimited value at a current level of the specification hierarchy and inserting a tag pair together with its delimited value at the next "child" level of the specification hierarchy. Further, inputting and outputting configuration specifications often involve conversion of the specifications between selected two of a string form, a decimal form, a hexadecimal form, and a binary form. Thus, in various embodiments, these commonly employed conversion functions are also provided. Implementation of these library functions are well within the ability of those ordinarily skilled in the art. Accordingly, they will not be further described.

Organization of Registration Data

Figures 7A, 7B:
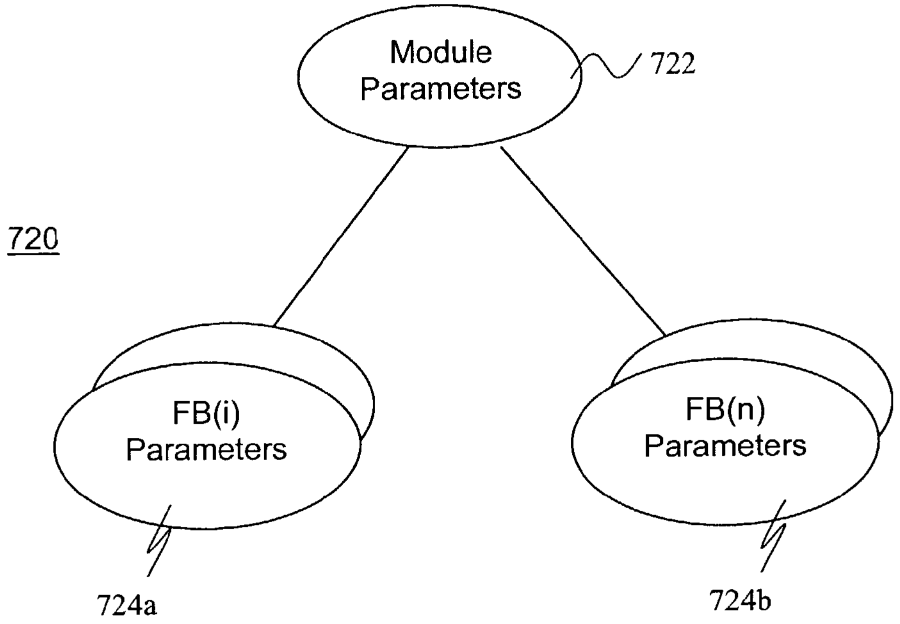
FIGS. 7*a*-7*b* illustrate one example data organization each for storing registration and working configuration data respectively, in accordance with one embodiment.

FIG. 7*a* illustrates a data organization suitable for use to store the registered module/function block configuration specification delimiters, in accordance with one embodiment. For illustrated embodiment, only the "start of configuration specification" delimiter for a module/function block is maintained. The FB_Config_Set and FB_Config_Get functions 524-526 for processing the configuration specification inputs or outputting the current configuration for a module/function block, along with the "start of configuration specification" delimiters are maintained in a look-up table 700. Each row 702 of look-up table 700 holds a registered "start of configuration specification" delimiter and the identifications 706-708 of its associated FB_Config_Set and FB_Config_Get functions 524-526. Table 700 may be accessed using a delimiter as a look-up key or an identifier of a FB_Config_Get function 526. Typically, table 700 is accessed in the former manner when processing a configuration specification input set, and accessed in the latter manner when outputting current configuration.

In one embodiment, each function block service routine 116 registers at least one of its configuration specification delimiter and the associated FB_Config_Set and FB_Config_Get functions 524-526 during initialization of networking apparatus 100. Accordingly, table 700 is dynamically built and maintained in memory 104 each time a networking apparatus starts up or re-initializes.

In another embodiment, each function block service routine 116 registers at least one of its configuration specification delimiter and the associated FB_Config_Set and FB_Config_Get functions 524-526 when the service routine is installed or refreshed on networking apparatus 100. Accordingly, table 700 is built during installation or update, and saved into a persistent store (not shown). In turn, table 700 is brought into memory 104 each time networking apparatus starts up or re-initializes.

FIG. 7*b* illustrates a data organization suitable for use to facilitate input and/or output of configuration specifications, in accordance with one embodiment. Similar to the embodiment of module data structure 118 illustrated in FIG. 3, data structure 720 for storing the configuration specifications being inputted/outputted is also object oriented. For the embodiment, configuration specification data structure 720 includes a root object 722 for storing module level configuration specifications, and a number of child objects 724* for correspondingly storing the configuration specifications for the corresponding function blocks of a MPONM 106*.

For ease of understanding, exemplary data structure 720 is merely illustrated as having only one descendant generation of child objects 722. Of course, as those skilled in the art would appreciate, exemplary data structure 720 may be organized in a hierarchical manner having two or more descendant generations of child objects.

As described earlier, in various embodiments, data structure 720 is a part of module data structure 118; but for other embodiments, it is created on an as needed basis, i.e. during input and/or output of configuration specifications, and deleted when a particular input/output processing is completed.

In alternate embodiments, the present invention may also be practiced employing other data structures or data organization techniques known in the art.

Configuration related Register Function

Figure 8:
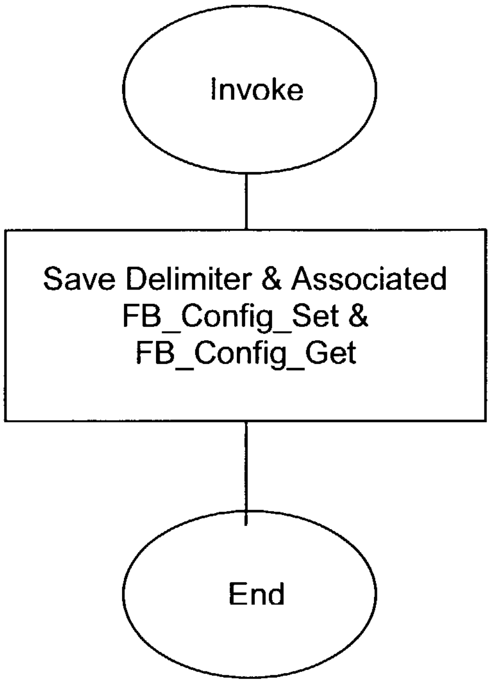
FIG. 8 illustrates the operational flow of the relevant aspects of the internal configuration related Register function of the MPONM API, in accordance with one embodiment.

FIG. 8 illustrates the operational flow of the relevant aspect of internal configuration related Register function 528, in accordance with one embodiment. As described earlier, at initialization or other selected points in time prior to configuration of particular function blocks, the corresponding service routines 116 of the various function blocks invoke configuration related Register function 528 to register at least one of its configuration specification delimiter with MPONM API 114.

For the embodiment, when invoking Register function 528, each function block service routine 116 provides Register function 528 with at least one of its configuration specification delimiter 704, and the corresponding identifiers 706-708 of FB_Config_Set and FB_Config_Get for the particular function block.

Thus, as illustrated, upon invocation, and receipt of a configuration specification delimiter 704 and identifications 706-708 of its associated FB_Config_Set and FB_Config_Get functions 530-532, Register function 528 stores the information in a row 702 of look-up table 700.

Config_Set and Config_Get Functions

Figure 9A:
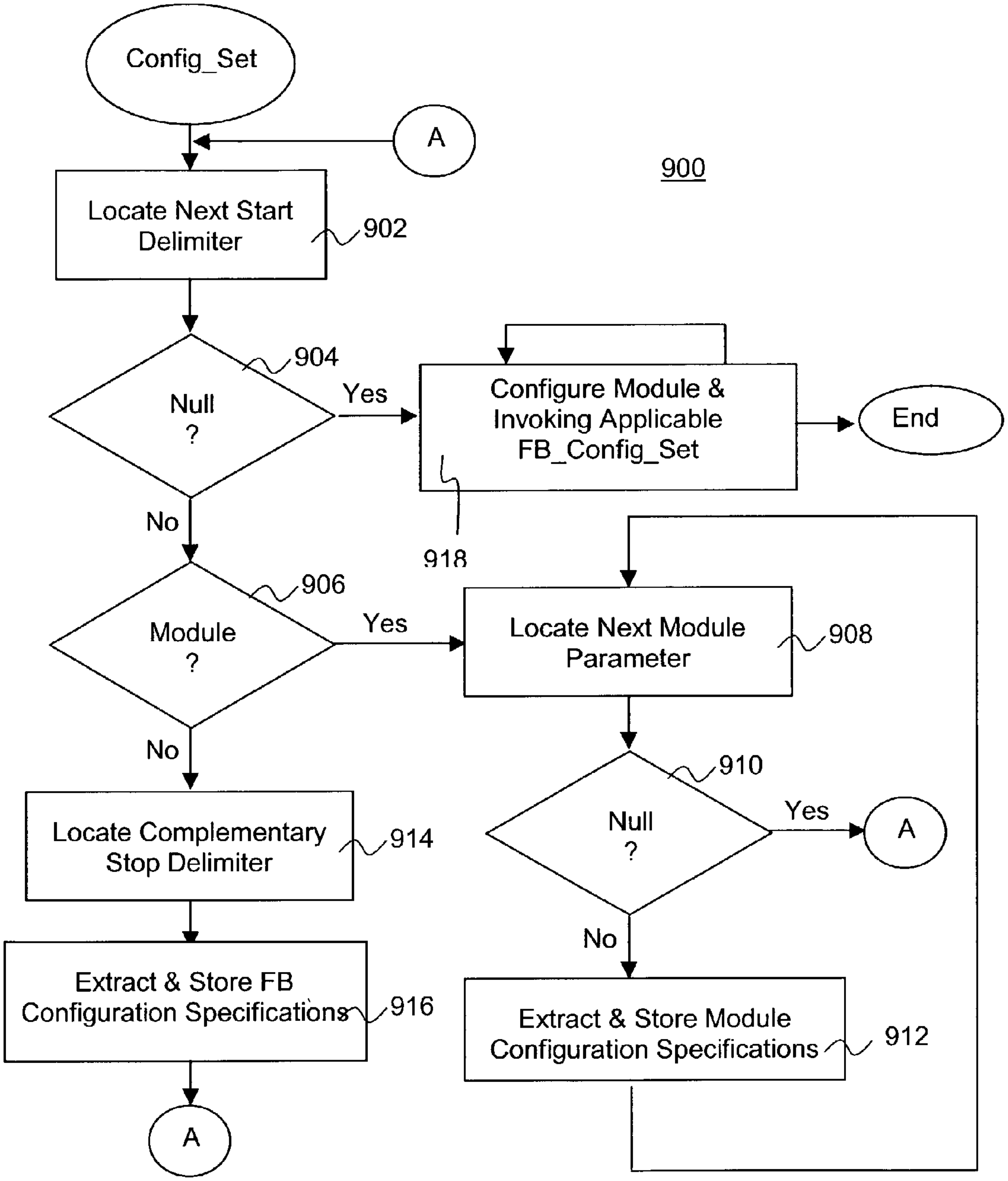
FIGS. 9*a*-9*b* illustrate the operational flow of the relevant aspects of the externalized Config_Set and Config_Get functions of the MPONM API, in accordance with one embodiment.
Figure 9B:
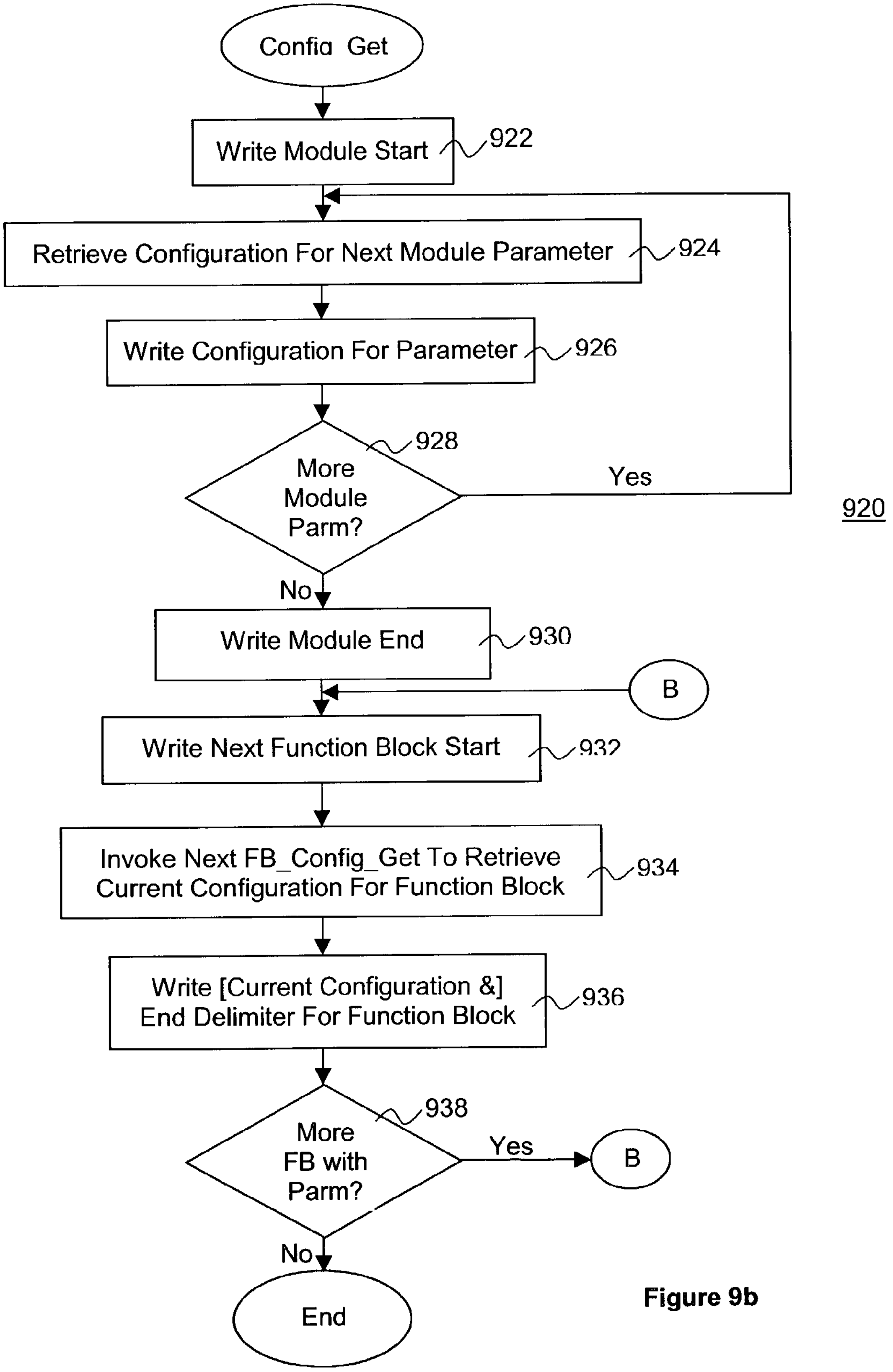

FIGS. 9*a*-9*b* illustrate the operational flow of the relevant aspect of Config_Set and Config_Get functions 524-526, in accordance with one embodiment. As illustrated in FIG. 9*a*, upon invocation, Config_Set 524 locates the "next" configuration specification start delimiter, block 902. At block 904, Config_Set 524 determines if the attempt to locate the "next" configuration specification start delimiter results in the return of a "null", denoting the end of a configuration specification input set has been reached. If so, the processing continues at block 918, to be described below.

However, if the "next" configuration specification start delimiter is located, Config_Set 524 further determines if the located start delimiter is a delimiter delimiting the start of configuration specifications for global parameters of a MPONM, block 906.

If so, Config_Set 524 proceeds to locate the "next" global module parameter, block 908. At block 910, Config_Set 524 determines if the attempt results in the return of a null, denoting the end of configuration specification for global module parameters. If the attempt was successful in locating a "next" global module parameter, Config_Set 524 extracts the specified configuration and stores the extracted configuration specification in the working data structure, block 912. However, if the attempt did result in the return of a null, processing continues back at block 902.

Back at block 906, if it is determined that a located configuration specification start delimiter is not the start delimiter for global module parameters, Config_Set 524 locates the complementary configuration specification stop delimiter, block 914. Upon locating the complementary configuration specification stop delimiter, Config_Set 524 extracts the specified configuration for a function block, bounded by the start and end delimiters, and stores the function block configuration specifications in the working data structure, block 916.

From block 916, the process continues back at block 902 again. Eventually, when all configuration specifications have been processed, the attempt to locate the "next" configuration specification start delimiter will result in the return of a null, and as described earlier, the process continues at block 918.

At block 918, Config_Set 524 first configures the MPONM at the module level based on the module level configuration specifications extracted and stored in the working data structure. Further, based on the function block configuration specifications extracted and stored in the working data structure, Config_Set 524 determines the appropriate FB_Config_Set 530 to invoke, and successively invokes these functions to configure the corresponding function blocks of the MPONM accordingly.

As described earlier, Config_Set 524 may e.g. determine the appropriate FB_Config Set 530 to invoke by accessing Table 700 to retrieve its identifier 706 using the located start delimiter 704. In various embodiments, Config_Set 524 may successively invoke the appropriate FB_Config_Set 530 in accordance with the order they are registered.

Further, Config_Set 524 may provide the extracted configuration specifications to a FB_Config_Set 530 directly, as part of the invocation, or indirectly, by providing a pointer to the working data structure (or the portion thereof) containing the application configuration specifications. In various embodiments, Config_Set 524 may provide the extracted configuration specifications directly for some FB_Config_Set functions 530, and indirectly for others.

As illustrated in FIG. 9*b*, upon invocation, Config_Get 526 first outputs a configuration specification start delimiter for global module parameters into the working data structure, block 922. Thereafter, Config_Get 526 retrieves the current configuration for a "next" global module parameter, block 924. At block 926, Config_Get 526 writes the retrieved current configuration for the global module parameter into the working data structure. Blocks 924-926 are repeated until all current configuration of global module parameters have been retrieved and outputted into the working data structure. Thereafter, Config_Get 526 writes the configuration specification end delimiter for global module parameters into the working data structure, block 930.

The process then continues at block 932, where Config_Get 526 writes the configuration specification start delimiter for the "next" function block into the working data structure. At block 934, Config_Get 526 invokes the appropriate FB_Config_Get 532 to retrieve and write the current configuration for the configurable parameters of the function block into the working data structure. At block 936, Config_Get 526 writes the configuration specification end delimiter for the function block into the working data structure.

In alternate embodiments, FB_Config_Get 532 may return the retrieved current configuration for the configurable parameters to Config_Get 526 instead. In these cases, Config_Get 526 may write the returned current configuration for the configurable parameters of the function block into the working data structure itself.

As described, Config_Get 526 may determine the appropriate configuration specification start and stop delimiters for the function block by accessing Table 700 and retrieving the information. In various embodiments, Config_Get 526 may also successively invoke the appropriate FB_Config_Get 532 in accordance with the order they are registered.

Blocks 932-936 are repeated until all configuration specifications for all configurable parameters of all function blocks of the MPONM of interest have been outputted into the working data structure in the earlier described delimited manner. For the embodiment, the determinations are made at block 938.

At such time, Config_Get 526 may output the current configuration specification in an appropriate format, e.g. in the XML like format illustrated in FIG. 6. Config_Get 526 may also transfer the output specification into a buffer designated by the requesting networking application 112.

FB_Config_Set and FB_Config_Get Functions

Figure 10A:
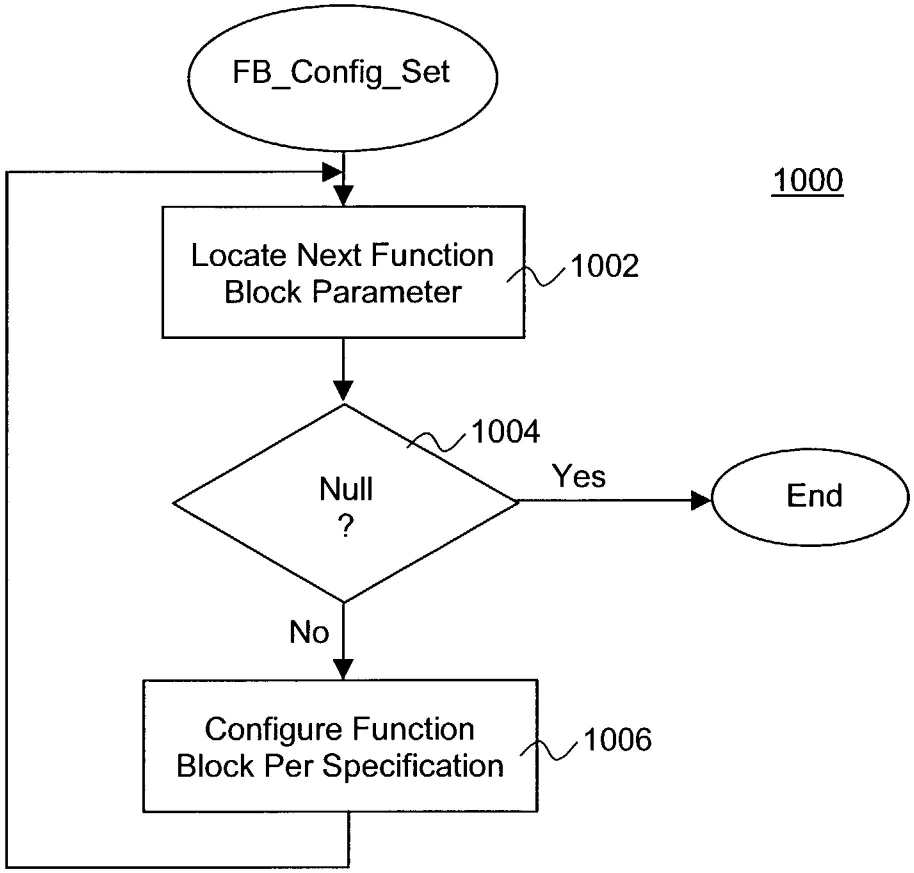
FIGS. 10*a*-10*b* illustrate the operational flow of the relevant aspects of an example each of the registered FB_Config_Set and FB_Config_Get functions of the function block service routines, in accordance with one embodiment.
Figure 10B:
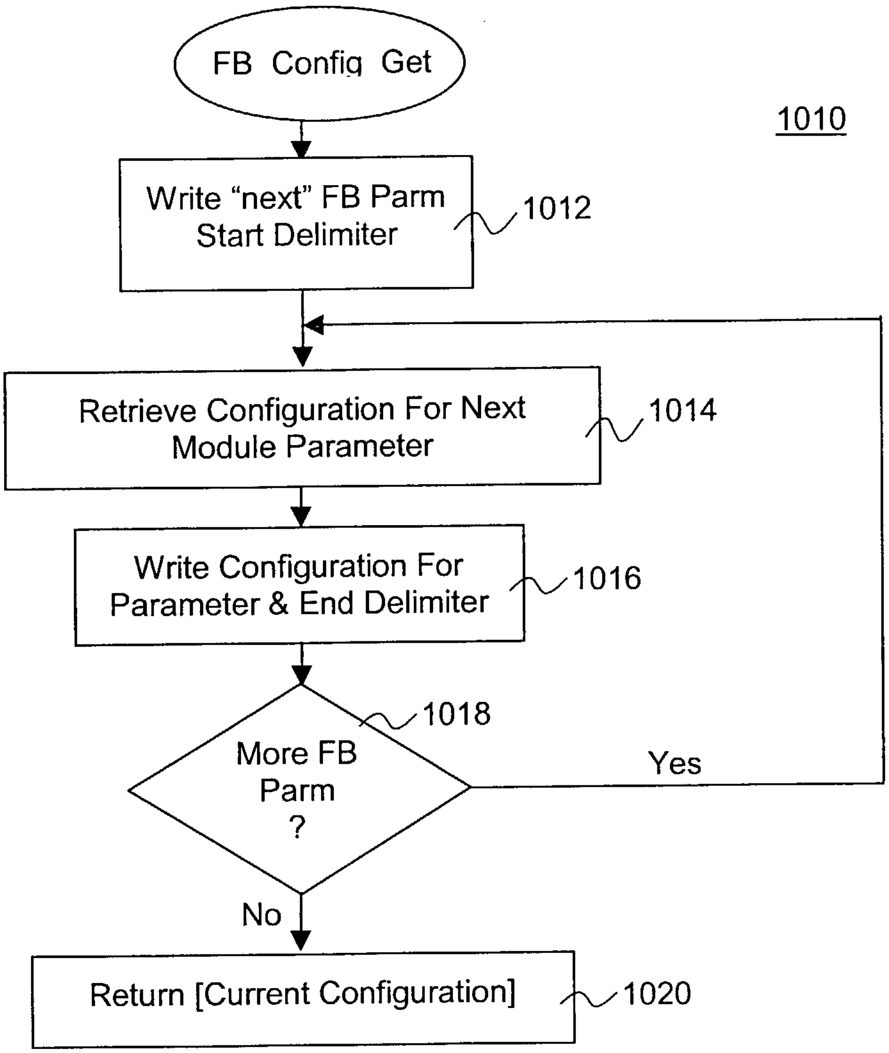

FIGS. 10*a*-10*b* illustrate the operational flow of the relevant aspect of an example implementation of FB_Config_Set and FB_Config_Get functions 530-532, in accordance with one embodiment. As illustrated in FIG. 10*a*, when invoked, FB_Config_Set 530 proceeds to locate the "next" configurable function block parameter per the extracted configuration specifications, block 1002. At block 1004, FB_Config_Set 530 determines if the attempt results in the return of a null, denoting the end of configuration specification for configurable parameters of the function block. If the attempt was successful in locating a "next" configurable parameter of the function block, Config_Set 530 extracts the specified configuration and configure the configurable parameter of the function block accordingly, block 1006. Upon configuration, the process continues back at block 1002.

However, if any attempt did result in the return of a null, processing terminates, as all specified configuration for configurable parameters of the function block have been processed.

As illustrated in FIG. 10*b*, upon invocation, FB_Config_Get 532 first outputs a configuration specification start delimiter for the next function block parameter to be retrieved and outputted (e.g. into the working data structure identified by Config_Get 526), block 1012. Thereafter, FB_Config_Get 532 retrieves the current configuration for the "next" configurable parameter of the function block to be retrieved and outputted, block 1014. At block 1016, FB_Config_Get 532 writes the retrieved current configuration for the configurable parameter of the function block, and if applicable, the end delimiter (into the working data structure designated by Config_Get 526).

Blocks 1014-1016 are repeated until all current configuration of configurable parameters of the function block have been retrieved and outputted.

Thereafter, FB_Config_Get 532 returns control to Config_Get 526, block 1020.

In alternate embodiments, FB_Config_Get 532 may accumulate the configuration specifications to be outputted in a private (temporary) working data structure, and returns the contents of the private (temporary) working data structure when returning control to Config_Get 526, block 1020.

CONCLUSION AND EPILOGUE

Thus, it can be seen from the above descriptions, a novel highly flexible MPONM API equipped to streamline and improve the ease of network applications in accessing, controlling or otherwise interacting with function blocks of multi-protocol processors of MPONM, including configuring the function blocks in an extensible manner, has been described.

In particular, for the described embodiments, except for the designed manner of interaction, Config_Set and Config_Get 524-526 and various FB_Config_Set and FB_Config_Get 530-532 may be implemented independently, thereby according great flexibility to their respective designers, as well as extensibility.

While the present invention has been described in terms of the above described embodiments, those skilled in the art will recognize that the invention is not limited to the embodiments described. The present invention can be practiced with modification and alteration within the spirit and scope of the appended claims.

For example, a "global" function block may be recognized to facilitate configuration of module parameters. For such an example, the operation logic of Config_Set and Config_Get may be simplified without having to provide for separate logic to handle module parameters. That is, operations such as those depicted by blocks 906-912 and 922-930 of FIG. 9*a*-9*b* may be eliminated.

Thus, the description is to be regarded as illustrative instead of restrictive on the present invention.

What is claimed is:

1. In an optical networking apparatus, a method of operation comprising:

invoking a registration function by a first service routine of a first interface block, protocol processing block, or coding block selected from a plurality of interface blocks, protocol processing blocks, and coding blocks selectively employed in combination with each other to service data transmission and receipt in accordance with a selected one of a number of frame-based protocols, wherein the plurality of interface blocks, protocol processing blocks, and coding blocks are included in a multi-protocol optical networking module (MPONM), wherein the first service routine invokes the registration function upon execution by a processor of the optical networking apparatus, wherein the invoked registration function is associated with a MPONM application programming interface (API), the invoked registration function to register a first pair of configuration specification delimiters that delimit configuration specifications applicable to the first selected interface block, protocol processing block, or coding block of an MPONM in a configuration specification input set, wherein the invoking of the registration function is in response to a request by a networking application of the optical networking apparatus, wherein the request identifies the MPONM including the first selected interface block, protocol processing block, or coding block by providing a handle of a device driver handling a connecting interface through which the MPONM is coupled to a bus, wherein the bus couples each of a plurality of MPONMs to each other in the networking apparatus;

extracting first configuration specifications by a configuration function of the MPONM API, upon execution by the processor, by processing a provided configuration specification input set, wherein extracting comprises extracting first configuration specifications applicable to the first selected interface block, protocol processing block, or coding block, based at least in part on the first registered pair of configuration specification delimiters of the first selected interface block, protocol processing block, or coding block;

providing the first extracted configuration specifications by the configuration function of the MPONM API, upon execution by the processor, wherein providing comprises providing the first extracted configuration specifications to the first service routine; and configuring the first selected interface block, protocol processing block, or coding block of the MPONM by the first service routine, upon execution by the processor, wherein configuring comprises configuring the first selected interface block, protocol processing block, or coding block of the MPONM in accordance with the provided configuration specifications.

2. The method of claim 1, wherein said first pair of configuration specification delimiters comprises a pair of complementary tag names, and said registration of a first pair of configuration specification delimiters comprises registering at least a selected one of the pair of complementary tag names.

3. The method of claim 1, wherein said registration function includes the first service routine registering a first set configuration function to be invoked and provided with extracted configuration specifications to configure the first selected interface, protocol processing block, or coding block of a MPONM;

said providing of the first extracted configuration specifications associated with the first selected interface block, protocol processing block, or coding block to the first service routine comprises providing the first extracted configuration specifications to the first set configuration function of the first service routine; and said first service routine configuring the first selected interface block, protocol processing block, or coding block comprises the first set configuration function of the first service routine configuring the first selected interface block, protocol processing block, or coding block of a MPONM.

4. The method of claim 1, wherein the method further comprises the configuration function of the MPONM API, upon execution by the processor, receiving a pointer to the configuration specification input set; and the configuration function of the MPONM API, upon execution by the processor, retrieving the configuration specification input set using the pointer.

5. The method of claim 1, wherein the method further comprises invoking the registration function of the MPONM API by a second service routine of a second selected interface block, protocol processing block, or coding block, upon execution by the processor, wherein invoking comprises invoking the registration function of the MPONM API to register a second pair of configuration specification delimiters that delimit configuration specifications applicable to the second selected interface block, protocol processing block, or coding block of a MPONM in a configuration specification input set;

extracting second configuration specifications by the configuration function of the MPONM API, upon execution by the processor, by processing the provided configuration specification input set, wherein extracting comprises extracting second configuration specifications applicable to the second selected interface block, protocol processing block, or coding block of a MPONM, based at least in part on the second registered pair of configuration specification delimiters of the second selected interface block, protocol processing block, or coding block;

providing the second extracted configuration specifications by the configuration function of the MPONM API, upon execution by the processor, wherein providing comprises providing the second extracted configuration specifications applicable to the second selected interface block, protocol processing block, or coding block to the second service routine; and configuring the second selected interface block, protocol processing block, or coding block of a MPONM by the second service routine, upon execution by the processor, wherein configuring comprises configuring the second selected interface block, protocol processing block, or coding block of a MPONM in accordance with the second provided configuration specifications.

6. The method of claim 5, wherein the first and second selected interface block, protocol processing block, or coding blocks are function blocks of a first MPONM.

7. The method of claim 5, wherein the first and second selected interface block, protocol processing block, or coding blocks are function blocks of a first and a second MPONM respectively.

8. The method of claim 1, wherein the method further comprises providing the configuration function of the MPONM API by the first service routine, upon execution by the processor, wherein providing comprises providing the configuration function of the MPONM API with current configuration of the first selected interface block, protocol processing block, or coding block of a MPONM; and merging said provided current configuration of the first selected interface block, protocol processing block, or coding block of a MPONM into a configuration specification output set by the configuration function of the MPONM API, upon execution by the processor, and delimiting the merged current configuration of the first selected interface block, protocol processing block, or coding block of the MPONM from other configuration specifications of other interface block, protocol processing block, or coding blocks of the MPONM using said first registered pair of configuration specification delimiters.

9. The method of claim 8, wherein the method further comprises said registration of the first pair of configuration specification delimiters further comprises registering a first get configuration function of the first service routine to be invoked to provide current configuration of the first selected interface block, protocol processing block, or coding block of a MPONM;

said providing of the current configuration by the first service routine to the configuration function of the MPONM API comprises the first get configuration function providing the current configuration of the first selected interface block, protocol processing block, or coding block of a MPONM to the configuration function of the MPONM API.

10. The method of claim 9, wherein the method further comprises a networking application, upon execution by the processor, providing a pointer to the configuration function of the MPONM API, pointing to a buffer into which the configuration function is to output the current configuration.

11. The method of claim 8, wherein the method further comprises providing the configuration function of the MPONM API with current configuration of the second selected interface block, protocol processing block, or coding block of a MPONM, by a second service routine of a second interface block, protocol processing block, or coding block selected from a plurality of interface blocks, protocol processing blocks, or coding blocks selectively employed in combination to service data transmission and receipt in combination with a selected one of a number of frame-based protocols, upon execution by the processor; and merging said provided current configuration of the second selected interface block, protocol processing block, or coding block of the MPONM into the configuration specification output set, by the configuration function of the MPONM API, upon execution by the processor, and delimiting the merged current configuration of the second selected interface block, protocol processing block, or coding block from other configuration specifications of other selected interface blocks, protocol processing block, or coding blocks of the MPONM using second registered pair of configuration specification delimiters.

12. The method of claim 11, wherein the first and second selected interface blocks, protocol processing block, or coding blocks are function blocks of a first and a second MPONM respectively.

13. The method of claim 1, wherein each of the plurality of MPONMs includes at least one multi-protocol processor, and each multi-protocol processor includes the plurality of interface blocks, protocol processing blocks, and coding blocks coupled to each other within the multi-protocol processor.

14. The method of claim 13 wherein each multi-protocol processor includes a system interface block employed to facilitate input of egress data from a system and output of ingress data to the system from the corresponding MPONM.

15. The method of claim 1 further comprising prior to the invoking of the registration function, a module initialization function of the MPONM API, in conjunction with the first service routine, creating an instance of a corresponding MPONM data structure to initialize the MPONM if the data structure has not been previously created for the MPONM.

16. The method of claim 15, further comprising if the data structure has not been previously created for the MPONM, the module initialization function returning a pointer to the corresponding MPONM data structure to the networking application, and the networking application saving the returned pointer upon receipt of the pointer from the module initialization function.

17. The method of claim 15, wherein the plurality of coder blocks include a media access control layer (MAC) block employed to perform data link sub-layer media access control processing on egress and ingress MAC data and the plurality of protocol processing blocks include one or more protocol processing blocks employed to perform data link sub-layer point-to-point (PPP) protocol and high level data link control (HDLC) processing on Internet Protocol, PPP, and HDLC data.

18. The method of claim 1, further comprising in addition to providing the handle of the device driver, the networking application further providing memory mapped addresses or a port number associated with a manner in which the MPONM is mapped on a connecting interface.

19. In an optical networking apparatus, a method of operation comprising:

invoking a registration function by a first service routine of a first interface block, protocol processing block, or coding block selected from a plurality of interface blocks, protocol processing block, and coding blocks selectively employed in combination to service data transmission and receipt in accordance with a selected one of a number of frame-based protocols, wherein the plurality of interface blocks, protocol processing block, and coding blocks are included in a multi-protocol optical networking module (MPONM), wherein the first service routine invokes the registration function upon execution by a processor of the MPONM, wherein invoking comprises invoking a registration function of a MPONM application programming interface (API) to register a first pair of configuration specification delimiters that delimit configuration specifications applicable to the first selected interface block, protocol processing block, or coding block in a configuration specification input set, wherein the invoking of the registration function is in response to a request by a networking application of the optical networking module separate from the first function block service routine, wherein the request identifies the MPONM including the first selected interface block, protocol processing block, or coding block by providing a handle of a device driver handling a connecting interface through which the MPONM is coupled to a bus, wherein the bus couples each of a plurality of MPONMs to each other in the networking apparatus;

receiving current configuration of the first selected interface block, protocol processing block, or coding block of a MPONM by the configuration function of a MPONM application programming interface (API); and merging said provided current configuration of the first selected interface block, protocol processing block, or coding block of the MPONM into a configuration specification output set by the configuration function of the MPONM API, upon execution by the processor, and delimiting the merged current configuration of the first selected interface block, protocol processing block, or coding block of the MPONM from other configuration specifications of other selected interface block, protocol processing block, or coding blocks of the MPONM using the first registered pair of configuration specification delimiters.

20. The method of claim 19, wherein the method comprises registering a first get configuration function of the first service routine to be invoked to provide current configuration of the first selected interface block, protocol processing block, or coding block of a MPONM.

21. The method of claim 20, wherein the method further comprises a networking application upon execution by the processor, providing a pointer to the configuration function of the MPONM API, pointing to a buffer into which the configuration function is to output the current configuration.

22. The method of claim 19, wherein the method further comprises a second service routine of a second selected interface block, protocol processing block, or coding block, upon execution by the processor, providing the configuration function of the MPONM API with current configuration of the second selected interface block, protocol processing block, or coding block of the MPONM; and merging said provided current configuration of the second selected interface block, protocol processing block, or coding block of the MPONM into the configuration specification output set by the configuration function of the MPONM API, upon execution by the processor, and delimiting the merged current configuration of the second selected interface block, protocol processing block, or coding block of the MPONM from other configuration specifications of other interface blocks, protocol processing block, or coding blocks of the MPONM using second registered pair of configuration specification delimiters.

23. The method of claim 22, wherein the first and second selected interface blocks, protocol processing block, or coding blocks are function blocks of a first and a second MPONM respectively.

24. A networking apparatus comprising a plurality of multi-protocol optical networking modules (MPONM), each having a plurality of interface blocks, protocol processing blocks, and coding blocks, each adapted to be selectively employed in combination with each other to service data transmission and receipt in accordance with a selected one of a number of frame-based protocols;

memory coupled to the plurality of MPONM, having stored therein a plurality of programming instructions implementing a registration function of a MPONM application programming interface (API) to accept registration of one or more configuration specification delimiter pairs by one or more service routines of one or more of said interface blocks, protocol processing blocks, or coding blocks selected from the plurality of interface block, protocol processing block, and coding blocks of the MPONM, the registration function invoked in response to a request by a networking application separate from the one or more function block service routines, wherein the networking application identifies the MPONM by providing a handle of a device driver handling a connecting interface through which the MPONM is coupled to a bus, the bus coupling each of a plurality of MPONMs to each other in the networking apparatus; and a configuration function of the MPONM API to extract configuration specifications for one or more of said selected interface block, protocol processing block, or coding blocks of a MPONM from a configuration specification input set using said one or more registered configuration specification delimiter pairs; and at least one processor coupled to the memory and the plurality of MPONM to execute the programming instructions.

25. The apparatus of claim 24, wherein each of said one or more pairs of configuration specification delimiters comprises a pair of complementary tag names, and said programming instruction implement the registration function to accept registration of at least a selected one of each of the pairs of complementary tag names.

26. The apparatus of claim 24, wherein said programming instructions implement the registration function to accept registration from the one or more service routine's corresponding set configuration, and further implement:

functions to be invoked and provided with extracted configuration specifications to configure the corresponding selected interface block, protocol processing block, or coding blocks of a MPONM; and the configuration function to provide the extracted configuration specifications to corresponding ones of the set configuration functions of the service routines.

27. The apparatus of claim 24, wherein the programming instructions further implement the configuration function of the MPONM API to receive a pointer to the configuration specification input set, and uses the received pointer to retrieve the configuration specification input set.

28. The apparatus of claim 24, wherein the programming instructions further implement the configuration function of the MPONM API to receive a current configuration of the selected interface block, protocol processing block, or coding blocks of a MPONM from corresponding ones of the service routines, and to merge said received current configuration of the selected interface block, protocol processing block, or coding blocks of the MPONM into a configuration specification output set, delimiting the merged current configuration of the selected interface block, protocol processing block, or coding blocks of the MPONM by using corresponding registered pairs of configuration specification delimiters.

29. The apparatus of claim 28, wherein the programming instructions further implement said registration function to accept registration of get configuration functions of the service routines to be invoked to provide current configuration of the selected interface block, protocol processing block, or coding blocks of a MPONM; and said configuration function of the MPONM API to receive from the get configuration functions the current configuration of the corresponding selected interface block, protocol processing block, or coding block of a MPONM.

30. The apparatus of claim 29, wherein the programming instructions further implement the configuration function of the MPONM API to receive from a networking application a pointer pointing to a buffer into which the configuration function is to output the current configuration.

31. A networking apparatus comprising a plurality of multi-protocol optical networking modules (MPONM), each having a plurality of interface blocks, protocol processing blocks, and coding blocks configured to be selectively employed in combination to service data transmission and receipt in accordance with a selected one of a number of frame-based protocols;

memory coupled to the plurality of MPONM, having stored therein a plurality of programming instructions implementing a first service routine of a first selected interface block, protocol processing block, or coding block, configured to provide a configuration function of a MPONM application programming interface (API) with current configuration of the first selected interface block, protocol processing block, or coding block of a MPONM; and a registration function of an MPONM application programming interface (API) configured to accept registration of one or more configuration specification delimiter pairs by one or more service routines of one or more of said selected interface block, protocol processing block, or coding blocks of the MPONM, the registration function invoked in response to a request by a networking application of the optical networking apparatus separate from the first service routine, wherein the request identifies the MPONM including the selected interface block, protocol processing block, or coding block by providing a handle of a device driver handling a connecting interface through which the MPONM is coupled to a bus, the bus coupling each of a plurality of MPONMs to each other in the networking apparatus; and a configuration function of the MPONM API to receive current configuration of the selected interface block, protocol processing block, or coding blocks of a MPONM and to merge said received current configuration of the function blocks of the MPONM into a configuration specification output set, delimiting the merged current configuration of the s selected interface block, protocol processing block, or coding block of the MPONM by using the registered pairs of configuration specification delimiters; and at least one processor coupled to the memory and the plurality of MPONM to execute the programming instructions.

32. The apparatus of claim 31, wherein the programming instructions implement said registration function to accept registration of get configuration functions of the service routines to be invoked to provide current configuration of the selected interface block, protocol processing block, or coding blocks of a MPONM; and wherein the programming instructions further implement said configuration function of the MPONM API to receive from the get configuration functions the current configuration of the corresponding selected interface block, protocol processing block, or coding blocks of a MPONM.

33. The apparatus of claim 32, wherein the programming instructions further implement the configuration function of the MPONM API to receive from a networking application a pointer pointing to a buffer into which the configuration function is to output the current configuration.

* * * * *